United States Patent Office 2,761,882
Patented Sept. 4, 1956

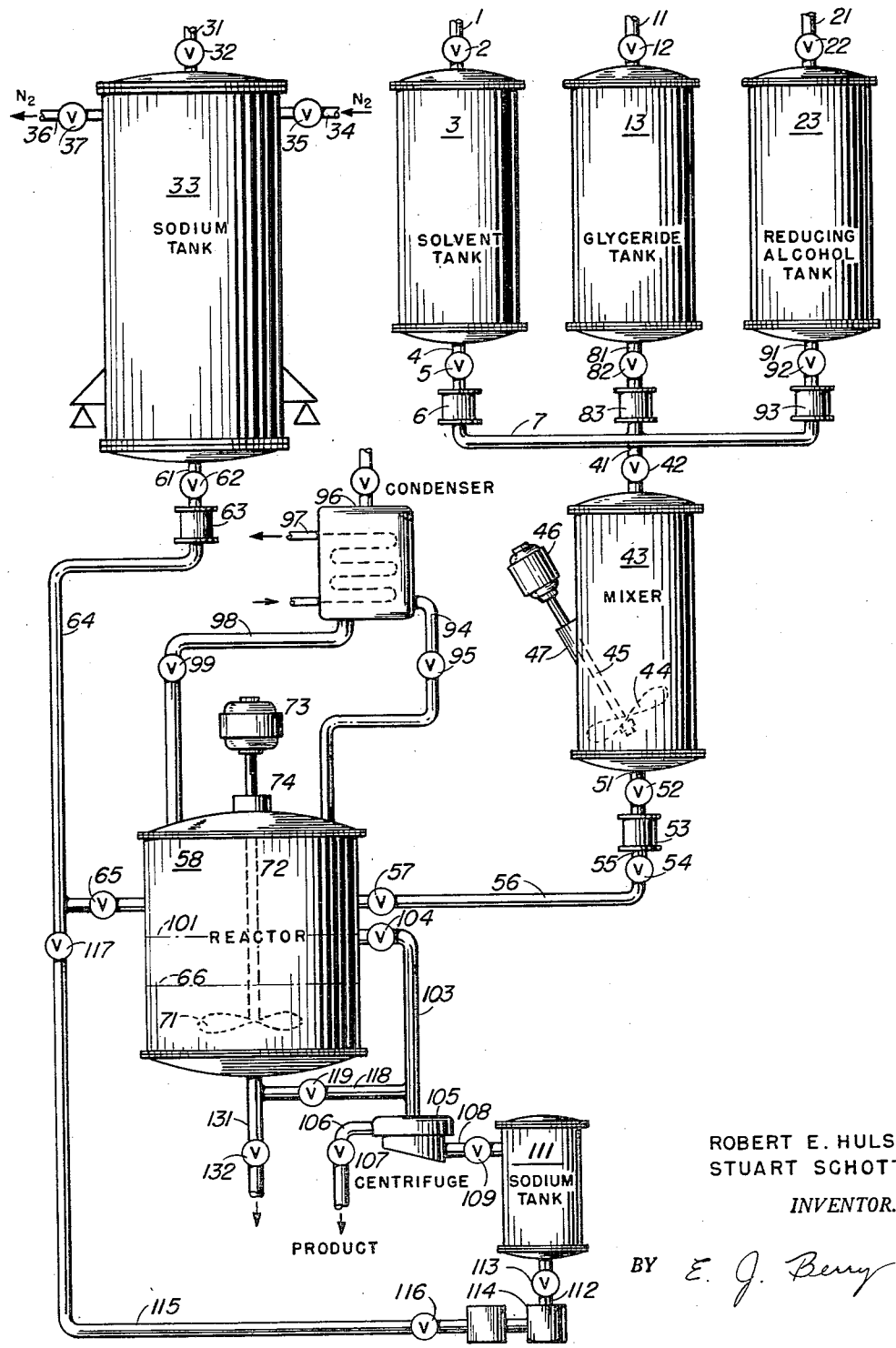

2,761,882
CONTINUOUS SODIUM REDUCTION PROCESS

Robert E. Hulse, Darien, Conn., and Stuart Schott, Cincinnati, Ohio, assignors to National Distillers Products Corporation, New York, N. Y., a corporation of Virginia Application April 4, 1955, Serial No. 498,888

1 Claim. (Cl. 260—638)

This invention relates to the so-called sodium process for the conversion of the fatty acid constituent of glycerides into the corresponding fatty alcohols. As normally carried out, a mass of sodium and a hydrocarbon solvent, ordinarily toluene or xylene, is introduced into a suitable reactor. The sodium and solvent are usually introduced in approximately equal proportions by weight. A mixture of triglyceride, additional hydrocarbon solvent and reducing alcohol is then prepared. The reducing alcohol is one that allows the reduction to proceed without regeneration of free hydrogen and a secondary or tertiary alcohol is usually preferred. Coconut oil as the triglyceride and methyl isobutyl carbinol as the reducing alcohol are typical materials used in commercial practice. The proportions of the triglyceride and alcohol are calculated according to the basic equation for the reaction, which is as follows:

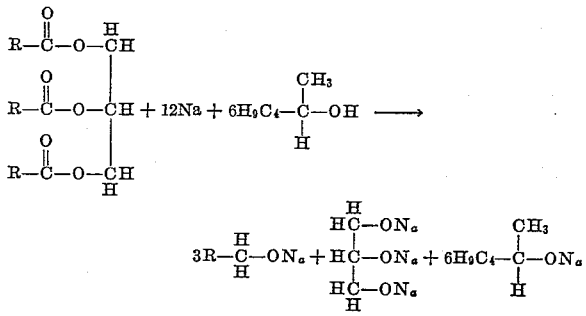

When using methyl isobutyl carbinol as reducing alcohol and toluene as solvent, the amount of solvent used is approximately equal in weight to the reducing alcohol. A typical reaction mixture, for example, with a particular coconut oil is 48 parts by weight of coconut oil, 44 parts by weight of methyl isobutyl carbinol, and 44 parts by weight of toluene.

The resulting solution of the three components is fed gradually and continuously into a reactor containing the initial charge of sodium and toluene, and the reaction proceeds in the direction indicated, by the equation, with the resulting consumption of the sodium and the generation of the sodium alcoholates of the reducing alcohol used and of the aliphatic alcohols produced and the simultaneous generation of the trisodium glyceride.

The reaction is exothermic and the heat is removed by refluxing the toluene diluent. The mass in the reactor is permitted to increase gradually until the sodium originally charged is approaching exhaustion, whereupon the entire mass consisting of the trisodium glyceride and the sodium alcoholates together with the solvent is discharged batchwise into a quencher in which the alcoholates are hydrolyzed, following which the solvent, fatty alcohols and reducing alcohol are separated and recovered.

An improved process for carrying out this reaction has been discovered in which the variables can be fixed and held constant over long periods of time, in which the reaction may be more rapidly and efficiently carried out with a reactor of smaller size, and in which the alcoholates can be supplied continuously to the quenching operation.

In order to achieve the good results which are obtained by the practice of this invention, it is necessary to employ the following steps in combination:

(a) The reduction operation to form the fatty alcohols is carried out continuously.

(b) There is a large excess (at least 5 times the stoichiometric amount) of metallic sodium present at all times during the period of the reduction reaction and even at the completion of the reaction after the ester has undergone complete reduction.

(c) The reduction reaction is carried out under conditions to give complete reduction in a reasonable time appropriate for continuous, commercial operations.

(d) The excess, dispersed metallic sodium remaining after completion of reaction is separated by settling or by a mechanical, gravimetric method from the liquid reaction mixture.

(e) The thus-separated metallic sodium is recycled to the reduction reaction zone.

Normally, sodium reduction processes as described in the literature use an excess of sodium but only relatively slight excesses, actually 1%–2% is specified. Although larger excesses may be used, under ordinary methods of operation, relatively large excesses would obviously lead to poor economy based on sodium usage since the excess is wasted, because of great difficulty in recovering the unreacted material.

It has been shown that the use of a slight excess of sodium metal in the sodium reduction process to produce fatty alcohols is desirable. Actually, in order to assure complete reduction of the ester or glyceride, at least a 5% excess is beneficial. A larger excess of sodium up to 10 to 20% over the stoichiometric amount would be most advantageous except that in batch type processes, there is no convenient and practical method of recovering excess sodium. Amounts of 5 or 10 times or more of sodium over the stoichiometric amount required are thus sufficient to assure complete reduction and maximum yields.

| Sodium, percent by weight (Excess over Theory) | Percent Alcohol Product (based on glyceride) |
|---|---|
| 0 | 86 |
| 1 | 86 |
| 2 | 86 |
| 5 | 88 |
| 10 | 91 |
| 20 | 93 |

Thus, there is a definite increase in yield with increasing excess of sodium metal. However, it is obvious that operation with the large excess of sodium needed to obtain maximum yields, in the normal batch process is not only uneconomical but also creates a hazard in the hydrolysis step. This same situation applies if ordinary, previously known continuous processes are operated with an appreciable excess of sodium to obtain maximum beneficial yield effects. The result is somewhat surprising. Although in batch processes, the bulk of the reduction to fatty alcohols is carried out with a considerable excess of sodium initially present (the full charge of sodium is placed in the reduction vessel and the glyceride to be reduced is gradually added thereto over a period of time), in the latter stages of the reduction, the excess of sodium becomes diminished until at the end of the addition of the glyceride there is substantially no excess of sodium whatever. Such an operation is obviously not controlled nor will it give maximum yields in a minimum of time.

However, operation of the process herein described, allows the entire reduction step to take place in the presence of substantial excesses of sodium, an improvement which is not possible with any other previously described processes.

The following examples are presented to further illustrate the invention, but it is not intended to limit the invention specifically thereto. Unless otherwise indicated, all parts are by weight.

*Example I*

The accompanying drawing is a diagrammatic showing of apparatus in which the invention may be carried out.

When proceeding in accordance with the invention a suitable hydrocarbon solvent, such as toluene, is introduced through pipe 1 controlled by valve 2, to storage tank 3, which may if desired be a weigh tank. A triglyceride, such as coconut oil, is supplied through pipe 11 controlled by valve 12 to storage tank 13, which may also be of the weigh type. A reducing alcohol, such as methyl isobutyl carbinol, is introduced through pipe 21 controlled by valve 22 to storage tank 23, which may also be of the weigh type. A charge of sodium, preferably in liquid phase, is introduced through pipe 31 controlled by valve 32 to storage tank 33, which may also be of the weigh type as diagrammatically indicated. Provision is made for introducing nitrogen or a similar inert gas into tank 33 above the level of the sodium therein through pipe 34 controlled by valve 35, any excess passing off through pipe 36 controlled by valve 37. A charge of solvent is withdrawn from storage tank 3 through pipe 4 controlled by valve 5 and look-box 6 into manifold 7, passing thence through pipe 41 controlled by valve 42, into mixer tank 43. Tank 43 is provided with mixing equipment diagrammatically indicated by propeller 44, driven through shaft 45, by motor 46. Shaft 45 enters mixer tank 43 through stuffing box 47. During this step, the mixer is not operated and a predetermined amount of the solvent is permitted to flow by gravity through pipe 51 controlled by valve 52, look-box 53, pipe 55 controlled by valve 54, and pipe 56 controlled by valve 57 into reactor 58, following which valves 5, 42, 52, 54 and 57 are closed. A predetermined amount of sodium is withdrawn from tank 33 through pipe 61 controlled by valve 62, look-box 63, and pipe 64 controlled by valve 65 into reactor 58. The amount of the sodium introduced is preferably substantially equal by weight to that of the solvent introduced. The amount of sodium and solvent introduced should be sufficient to fill reactor 58 up to the approximate level indicated by line 66.

The sodium and solvent are intimately comingled by the mixing device diagrammatically indicated by propeller 71 driven through shaft 72 by motor 73. Shaft 72 enters reactor 58 through stuffing box 74. Simultaneously a weighed amount of solvent is passed from storage tank 3 into mixer tank 43, valves 52, 54 and 57 being closed during this operation. Following this, valve 5 is closed and a weighed amount of triglyceride is passed into mixer tank 43 through pipe 81 controlled by valve 82, look-box 83, pipe 7 and pipe 41 controlled by valve 42. Following this, valve 82 is closed and a weighed amount of reducing alcohol is passed into mixer tank 43 through pipe 91 controlled by valve 92, look-box 93, pipe 7 and pipe 41 controlled by valve 42. The proportions of triglyceride and reducing alcohol are those stoichiometrically indicated by the formula and the amount of solvent is roughly equal in weight to the reducing alcohol. As hereinabove stated, for a particular coconut oil of fairly average composition the proportions are substantially as follows:

| | Parts |
|---|---|
| Coconut oil | 48 |
| Toluene | 44 |
| Methyl isobutyl carbinol | 44 |

When the materials in these proportions have been charged into mixer tank 43, valve 42 is closed and they are thoroughly comingled by operating the mixing device indicated by numerals 44—46. During this time, the materials in reactor 58 are brought to a temperature at which the sodium reduction of glycerides will proceed, which may conveniently be the boiling point of toluene under normal pressure. The temperature is maintained by conducting away the vapors of toluene through pipe 94 controlled by valve 95 into reflux condenser 96 provided with cooling coil 97, the condensed solvent returning to reactor 58 through pipe 98 controlled by valve 99.

After the mixing has been completed, the mixed materials are fed continuously into reactor 58 through look-box 53 by opening valves 52, 54, and 57. The mixing in the reactor is continuously maintained throughout the entire addition period. The materials are fed into the reactor at a rate such that if continued without replenishment the sodium in reactor 58 would be entirely consumed within about 30 minutes. At the expiration of several minutes, however, due to the continuous addition, the liquid level in reactor 58 will have risen approximately to the level indicated by the line 101. The addition of raw materials and the mixing are continued at the same rate, and from this point on any excess of material in the reactor over that necessary to maintain approximately the level 101 is permitted to flow off through pipe 103 controlled by valve 104 into centrifuge 105. At this point approximately one-fourth of the sodium initially supplied to reactor 58 will have been consumed. As soon as the material starts to overflow, sodium is introduced either continuously or intermittently from tank 33 through look-box 63, by opening valve 65 and by partly opening valve 62. Within the scope of the invention it would of course be possible to have started the introduction of sodium from tank 33 simultaneously with the start of the feed from tank 43 to maintain the mass of sodium in reactor 58 constant and to prevent any diminution of the same. This is not, however, imperative and it is entirely feasible in the application of the invention to permit the sodium in reactor 58 to become partially depleted during the initial stage before the reactor starts to overflow.

As stated, the overflow is passed into centrifuge 105 which is in operation. Centrifuge 105 splits the overflow into two separate phases, i. e., a clarified phase of lesser specific gravity consisting of alcoholates in solution in the hydrocarbon solvent, which is conducted away from the system through pipe 106 controlled by valve 107, and a heavier phase conducted away through pipe 108 controlled by valve 109. This heavier phase consists principally of solid sodium from reactor 58, together with sufficient of the solvent and alcoholates to form a slurry which can be transported as a liquid. If the centrifuge is operated at a temperature above the melting point of sodium, it may consist entirely of sodium. This material passes into tank 111 and during normal operation passes out through pipe 112 controlled by valve 113 into pump 114, by which it is forced through pipe 115 controlled by valves 116 and 117 back into pipe 64, and thence back into reactor 58. The net result of this is that all of the unreacted sodium which is continuously abstracted from reactor 58 is returned to the same.

Whenever the system is to be shutdown for maintenance or repairs, the entire contents of the reactor are continuously withdrawn through the centrifuge 105 through pipe 118 controlled by valve 119, the alcoholates passing off to quench through pipe 106 while the sodium is impounded in tank 111 for use when starting the system up again.

Notwithstanding the return to the system of the sodium separated by centrifuge 105, there is a progressive loss of sodium due to reaction with the charge. The combined rate of addition of sodium to the reactor, both from this source and from the storage tank 33, is sufficient to maintain the amount of sodium in the reactor at a predetermined concentration. This concentration is stoichiometrically at least five, and preferably at least ten times the amount required to react with the charge supplied during any one minute interval. Preferably, the sodium added from tank 33 and that returned by pump 114 is supplied at a continuous rate to maintain this concentration in the reactor, but this is not essential since an excess over this amount is not prejudicial and it may therefore be supplied intermittently so long as the amount of sodium present is not below this minimum for any sustained period.

*Example II*

A mixture was prepared having the following composition:

| Material | Parts |
|---|---|
| Coconut oil | 400 |
| Methyl isobutyl carbinol | 378 |
| Toluene | 309 |

This mixture was arranged to be fed gradually into a reactor vessel fitted with an agitator, reflux condenser, and inlets and outlets similar to the set up shown in the figure of Example I. A charge of sodium weighing 1014 parts was introduced into the reduction flask along with 1200 parts of toluene. The reactor was heated until the sodium was melted and then the agitator was started which dispersed the sodium in particles approximately 1 mm. in diameter. The mixture of ester, reducing alcohol, and toluene was then fed in a continuous manner at a rate of about 25 ml. per minute. After about one-half of this charge had been introduced into the reactor, the reaction mixture began to flow out through a side outlet to a settling chamber which was connected to the reactor via a bottom outlet which returned the settled sodium to the lower portion of the reaction flask. The settled reaction mixture, freed of the excess sodium, was allowed to overflow into another vessel for hydrolysis by introduction into boiling water. The settling chamber, and various lines leading from the reduction vessel were all maintained at a temperature above the melting point of sodium. This avoided any clogging of lines due to solidification of metallic sodium.

Additional batches of the mixture of coconut oil, methyl isobutyl carbinol, and toluene were prepared as needed about every fifty minutes. Additional sodium was added to the reactor at approximately hour intervals. About 170 parts of sodium were added each time.

After running the process as described above for about six hours, the hydrolyzed material was collected. The residual sodium in the reactor and settling tank was drained off and weighed. The reaction mixture was then drained off and hydrolyzed in the usual manner and the hydrolyzed solutions combined with the bulk of product. The fatty alcohol was isolated in the usual manner. The following results were obtained:

| Material | Parts |
|---|---|
| Sodium charged | 1500 |
| Sodium remaining | 572 |
| Sodium reacted | 928 |
| Coconut oil used | 2400 |
| Fatty alcohol product | 2249 |
| Yield on coconut oil | 94 |
| Yield on sodium | 94 |

While there are above disclosed but a limited number of embodiments of the process of the invention herein described, it is possible to produce still other embodiments without departing from the inventive concept herein disclosed, and it is desired therefore that only such limitations be imposed on the appended claim as are stated therein.

This application is a continuation-in-part of application Serial No. 236,398, filed July 12, 1951, and now abandoned.

What is claimed is:

A continuous sodium reduction process for complete conversion of the fatty acid components of fatty acid triglycerides to the corresponding fatty alcohols which comprises the steps in combination of continuously maintaining a reaction mixture of an aromatic hydrocarbon containing at all times dispersed sodium in an amount at least five times the stoichiometric amount required for the amount of triglyceride undergoing reduction, maintaining said reaction mixture at the reflux temperature of said hydrocarbon, continuously adding to said reaction mixture at a substantially uniform rate a preformed mixture of said hydrocarbon, said triglyceride, and a reducing alcohol, said triglyceride and reducing alcohol being added in substantially stoichiometrically equivalent amounts, continuously withdrawing a portion of the reaction mixture, said addition of preformed mixture and withdrawal of reaction mixture being controlled at rates sufficient to maintain a substantially uniform volume of said reaction mixture, meanwhile controlling additions and withdrawals to permit substantially complete reduction of said fatty acid triglycerides to the corresponding fatty alcohols, simultaneously and continuously adding sodium to said reaction mixture at a rate sufficient to maintain therein, and at all times including the termination of the reduction, a concentration of sodium at least five times the stoichiometric amount required for the amount of triglyceride undergoing reduction, centrifuging the withdrawn portion of reaction mixture to obtain a light phase consisting substantially of alcoholates and hydrocarbon and a heavy phase consisting substantially of sodium, at least intermittently returning said separated excess unreacted sodium to the reaction mixture wherein the triglyceride is undergoing reduction, hydrolyzing the alcoholates in the light phase, and recovering fatty alcohols therefrom.

References Cited in the file of this patent

UNITED STATES PATENTS

| | | |
|---|---|---|
| 2,019,022 | Scott et al. | Oct. 29, 1935 |
| 2,460,969 | Blinoff | Feb. 8, 1949 |